United States Patent
McKown

(10) Patent No.: US 7,477,634 B1
(45) Date of Patent: Jan. 13, 2009

(54) METHOD AND APPARATUS FOR A CHIP-LEVEL NO-DECISION FEEDBACK EQUALIZER FOR CDMA WIRELESS SYSTEMS

(75) Inventor: Russell McKown, Richardson, TX (US)

(73) Assignee: Advanced Receiver Technologies, LLC, Dallas, TX (US)

( * ) Notice: Subject to any disclaimer, the term of this patent is extended or adjusted under 35 U.S.C. 154(b) by 156 days.

(21) Appl. No.: 11/350,486

(22) Filed: Feb. 9, 2006

Related U.S. Application Data

(63) Continuation-in-part of application No. 11/280,858, filed on Nov. 16, 2005.

(60) Provisional application No. 60/651,716, filed on Feb. 10, 2005.

(51) Int. Cl.
*H04B 7/216* (2006.01)

(52) U.S. Cl. ........................ 370/342; 370/485; 375/140; 375/148; 375/232

(58) Field of Classification Search ................ 370/342, 370/485; 375/232, 140, 148
See application file for complete search history.

(56) References Cited

U.S. PATENT DOCUMENTS 6,496,534 B1 * 12/2002 Shimizu et al. ............. 375/148

2003/0156603 A1 * 8/2003 Rakib et al. ................. 370/485
2004/0105489 A1 * 6/2004 Kim et al. ................... 375/140
2004/0264557 A1 * 12/2004 Maruyama .................. 375/148
2006/0171451 A1 * 8/2006 Pietraski et al. ............. 375/232

* cited by examiner

*Primary Examiner*—Lester Kincaid
*Assistant Examiner*—Michael T Vu

(57) ABSTRACT

A method and apparatus for constructing a model of a sampled transmitted CDMA downlink signal comprises receiving a sampled signal at a first module (810), wherein the signal received at the first module has been filtered, receiving despread symbol data for all possible spread codes at a second module (820) from the first module, determining active codes of the possible spread codes in the filtered sampled signal by the second module, receiving from the first module, the despread symbol data identified with the active codes, at a third module (830), providing estimates of a symbol value and a gain based on the symbol data identified with the active codes by the third module, receiving the symbol value and gain estimates from the third module and the active codes from the second module at a fourth module (840), and constructing a model of the sampled transmitted CDMA downlink signal using the symbol value and gain estimates for the active codes by the fourth module.

2 Claims, 11 Drawing Sheets

METHOD AND APPARATUS FOR A CHIP-LEVEL NO-DECISION FEEDBACK EQUALIZER FOR CDMA WIRELESS SYSTEMS

CROSS-REFERENCE TO RELATED APPLICATIONS

The present patent application is related to and claims the benefit of provisional patent application Ser. No. 60/651,716, filed on Feb. 10, 2005, entitled Method And Apparatus For A Chip-Level No-Decision Feedback Equalizer For CDMA Wireless Systems. Further, the present patent application is a Continuation-In-Part of patent application Ser. No. 11/280,858, filed on Nov. 16, 2005, entitled Chip-Level No-Decision Feedback Equalizer For CDMA Wireless Systems. Still further, the present application is related to patent application Ser. No. 10/796,596 filed on Mar. 9, 2004, entitled Methods and Apparatus For Single Burst Equalization of Single Carrier Signals In Broadband Wireless Access Systems, the entire contents of each of which are enclosed by reference herein.

BACKGROUND OF INVENTION

The Third Generation Partnership Project (3GPP) organization develops the world-harmonized specifications for mobile, multimedia, wireless cellular communications. There are five specified 3 G modes, three of which are CDMA. The CDMA modes are CDMA2000, wideband CDMA (W-CDMA) and time division synchronous CDMA (TD-SCDMA). The 3 G operating modes W-CDMA and CDMA2000 are by far the most dominant in terms of current commercial services, operator deployment plans and vendor support. W-CDMA is the 3 G system of choice for GSM based networks (world-wide), whereas CDMA2000 is used primarily with the IS-41 based networks (mostly in the United States). The TD-SCDMA mode is primarily associated with China.

The rake receiver is the most popular and conventional CDMA baseband receiver. It is called the rake receiver because it has the structure of a rake. FIG. 1 shows a block diagram of certain processes performed by a system implementing the rake receiver based on a single receive antenna 110. The rake receiver contains a bank of despreaders 120 whose input differ by a number of selected sample delays 140. Each despreader despreads the received chip sequence using the spread code assigned by the network management to the individual user/subscriber. The resulting outputs are combined using a linear combiner 160. In order to get the maximum signal-to-noise ratio (SNR), a maximum ratio combining (MRC) scheme can be used in the linear combiner. The output of the rake receiver is the basis for making a received symbol decision element 180.

The problem with the rake receiver is its poor performance in certain types of multipath propagation channels, especially for multiuser CDMA downlink signals. For example, it is becoming increasingly recognized within the technical community that the performance of the conventional rake receiver is insufficient to support the operation of the 3GPP specified high speed downlink packet access (HSDPA) protocol in one of the specified multipath test channels for HSDPA, i.e., the "120 kilometer per hour Vehicular Channel A".

For a multipath radio frequency (RF) propagation channel, the higher the 3 G CDMA downlink "loading", the poorer the rake receiver performs. The term "loading" refers to the number, K, of user data-channels that are simultaneously transmitted in the downlink. To separate the user data-channels, K different orthogonal short spreading codes, such as Walsh-Hadamard codes or the W-CDMA specified orthogonal variable spreading factor (OVSF) codes, are applied to the K streams of user data before summing the coded data to form a "loaded" signal.

A reason the rake receiver performs worse as the CDMA downlink loading is increased can be explained by viewing the rake receiver as a multipath-incorporating matched filter, in contrast to a multipath-correcting filter. For single user CDMA signals, the rake receiver is relatively well motivated. However, in for example a W-CDMA downlink signal that is carrying K>1 OVSF spread data-channels in a multipath RF propagation channel, the multipath destroys the orthogonality of the K OVSF codes as presented to the receiver. The loss of orthogonality of the OVSF codes results in the multiple user data-channels appearing as multiple access interference (MAI) to each other. In the rake receiver, severe MAI results for even a relatively small number of users in a given cell when multipath is present.

As an illustration of the problem, consider a 3 G CDMA system, W-CDMA for example, with a base station that is serving a specific user, say Sam, that happens to be in a difficult multipath propagation environment and is using a W-CDMA handset containing a conventional rake receiver. If Sam is to be provided a reliable connection, the W-CDMA base station must reduce the service to other users sharing Sam's downlink signal and/or reduce the data rate to Sam. Reducing the number of multiple users reduces the MAI in the rake receiver that results from the loss of OVSF orthogonality, thus improving its performance. Reducing the data rate to Sam by increasing the OVSF code length, i.e., the spread factor SF, used to carry the data symbols, typically improves his handset's rake receiver performance by brute force SIR improvement. However, the latter technique may be ineffective due to the continued loss of OVSF orthogonality. In any case, reducing the number of user-data channels in the downlink and/or increasing the SF for Sam results in a reduced capacity for the serving W-CDMA base station. Ultimately, this loss of base station capacity translates to a loss of revenue to the service provider.

Other, more complex, CDMA receiver designs have been proposed in order to improve the performance of user equipment (UE) for the multiuser CDMA downlink signal. For example, one such design uses two chip-level linear equalizers and two antennas. FIG. 2 shows a block diagram of certain processes performed by a CDMA receiver system implementing two chip-level linear equalizers 220 and two receive antennas 210. The output of the equalizers is summed by summing element 240 and despread by dispreading element 260 so that the user data of interest can be decided by decision element 280. The coefficients of chip-level linear equalizers 220 can be obtained from estimates of the channel impulse response (CIR) provided a matrix inversion is performed. The development and performance evaluation of the two antenna/two chip-level linear equalizer, receiver diagramed in FIG. 2 has been published by T. P. Krauss, M. D. Zoltowski and G. Leus: "*Simple MMSE Equalizers for CDMA Downlink to Restore Chip Sequence. Comparison to Zero-Forcing and Rake*", Proc. IEEE ICASSP 2000, pp. 2865-2868. If only one antenna/linear equalizer is used the performance improvement relative to the rake receiver is significantly diminished.

Another example of a more complex CDMA receiver design that has been proposed in order to improve the performance for the multiuser CDMA downlink signal is the multiuser multistage interference canceller. FIG. 3 shows a block diagram of certain processes performed by a system implementing a multiuser multistage interference canceller for a CDMA receiver. In this interference cancellation scheme, the signal is first passed through a bank of correlators 320 and then each user's signal is reconstructed and cancelled by subtraction element 340 from the received signal. This process may be repeated for multiple stages. The effectiveness of the cancellation depends on the estimation element 360, which involves symbol decision and signal gain/phase estimation, and the reconstruction element 380, which involves re-spreading. For a general discussion of the multiuser multistage interference canceller of FIG. 3, e.g., as implemented to perform successive interference cancellation or parallel interference cancellation, see George Aliftiras, "*Receiver Implementations for a CDMA Cellular System*", Masters Thesis, Dept. of Electrical Engineering, Virginia Polytechnic Institute, July 1996. For a detailed development, complexity analysis and performance evaluation of the multipath interference canceller (MPIC) see K. Higuchi, A. Fujiwara, M. Sawahashi, "*Multipath Interference Canceller for High-Speed Packet Transmission with Adaptive Modulation and Coding Scheme in W-CDMA Forward Link*" IEEE J. Selected Areas in Communications, Vol. 29, No. 2, February 2002. The MPIC was also presented by NTT DoCoMo in several contributions to the TSG-RAN Working Group 1 of 3GPP.

Another example of a more complex CDMA receiver design that has been proposed in order to improve the UE performance for the multiuser CDMA downlink signal is an iterative receiver with a chip-level decision feedback equalizer (DFE). FIG. 4 shows a block diagram of certain processes performed by a system implementing an iterative chip-level DFE. In this example, the CDMA signal contains orthogonal spread data for K users and is received with L antennas. The despread output of a bank of K rake receivers 410 is used to provide the initial chip-level decisions for the feedback filter 420 of the DFE. This mode is indicated by position I of the feedback switch 415. To generate these initial chip-level decisions, the multiuser despread symbol decisions from decision elements 430 are re-spread by spreading elements 440 and summed by summation element 445. The chip-level DFE output 450 is then despread by despreading elements 460 and symbols are decided by decision elements 470 for each of the K users. These symbol decisions are re-spread by spreading elements 380 and summed by summation element 485 to provide the chip-level decisions for the feedback filter 420 during the subsequent iteration(s) of the DFE. This mode is indicated by position F of the feedback switch 415. The development and performance evaluation of the iterative chip-level DFE diagramed in FIG. 4. has been published by J. Choi, S. Rag Kim, and Cheng-Chew Lim: "*Receivers with Chip-Level DFE for CDMA Down/ink Channels*", IEEE Trans. Wireless Comm., No. 1, January 2004. These authors point out that the iterative chip-level DFE provides superior performance to all of the above mentioned CDMA receiver designs in the multipath channels tested. The reason the iterative chip-level DFE is somewhat superior to the MPIC is that the latter is more sensitive to incorrect tentative decisions. However, for even moderately loaded CDMA downlink signals, all of the above mentioned complex receiver designs (i.e., FIGS. 2 to 4) significantly outperform the rake receiver (FIG. 1) in the multipath channels tested.

Another example of a more complex CDMA receiver design that has been proposed in order to improve the performance for the multiuser CDMA downlink signal is the use of any of the above receiver structures to support a multiple input multiple output (MIMO) use of the propagation channel. In a MIMO system, multiple receive antennas are used in conjunction with transmission over multiple transmit antennas using a signal coding scheme, e.g., space time coding (STC), to provide additional diversity gain over that available with conventional multiple receive/transmit antenna diversity. Although a MIMO CDMA system can increase the capacity and reliability of the wireless channel, the receiver complexity is further increased, not only at the level of baseband processing discussed here but also at the levels of the RF receiver/transmitter front-end, the antennas, and radio management overhead. For an explicit example, see the development and performance evaluation of the iterative chip-level DFE for MIMO CDMA by Agus Santoso, "*Chip-level DFE for the CDMA Downlink Channel*", Masters Thesis, Dept. of Electrical Engineering, University of Adelaide, Australia, October 2003.

SUMMARY OF INVENTION

One problem with the use of prior art complex CDMA receiver designs is that they consume more resources, both in terms of area on an integrated electronic circuit and in terms of electrical power. Although these resources may not be scarce for base station receiver applications, they are for handset receiver applications. The invention is directed generally to a 3 G CDMA receiver design that has a performance comparable to the better complex receiver designs, e.g., the iterative chip-level DFE, while retaining a complexity that is comparable to or less than a conventional rake receiver, thus conserving resources on a handset receiver.

According to a preferred embodiment for such a 3 G CDMA receiver, a chip-level, no-decision feedback equalizer (NDFE) provides a basis for a low complexity, high performance receiver for 3 G CDMA signals. Chip-level decisions are avoided as they are simply not readily available given the 3 G CDMA signals that are designed to be loaded with multiuser data-channels by means of orthogonal short codes, e.g., the OVSF codes of W-CDMA. The NDFE employs the output of the differential combiner of the feedforward filter output and the feedback filter output as direct input to the feedback filter, thus creating an infinite impulse response (IIR) linear filter structure for channel equalization.

According to a preferred embodiment, the coefficients of the NDFE are computed to be equivalent to the coefficients of a conventional DFE as defined by the minimum mean squared error (MMSE) criteria. This results in the NDFE, a linear IIR filter, providing an equalization performance that is only slightly degraded from the prior art non-linear DFE and much better than prior art linear equalizers.

The performance of a CDMA receiver based on the chip-level NDFE can be better than the performance of the complex receiver designs of prior art. The NDFE is non-iterative and has no error propagation. The complexity of the chip-level NDFE receiver of this invention is similar to or less than a conventional rake receiver. The chip-level NDFE receiver is a solution to the problem of designing a low complexity, high performance receiver for the multiuser 3 G CDMA downlink signals. It enables a large coverage area per base station for delivering high rate data to vehicular speed mobile users, e.g. operation of the HSDPA mode with mobile W-CDMA handsets.

DETAILED DESCRIPTION

Figure 1:
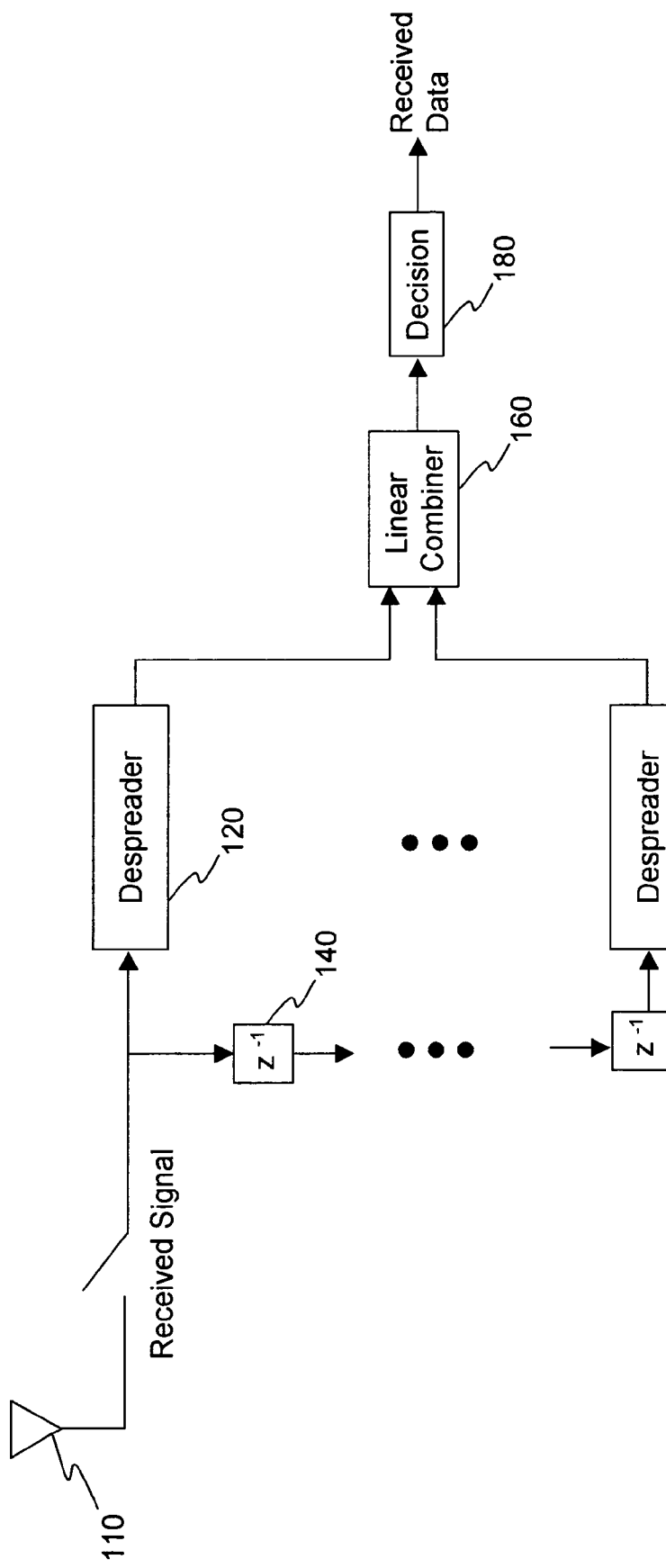
FIG. 1 is a block diagram of certain processes performed by a prior art system implementing the rake receiver.
Figure 2:
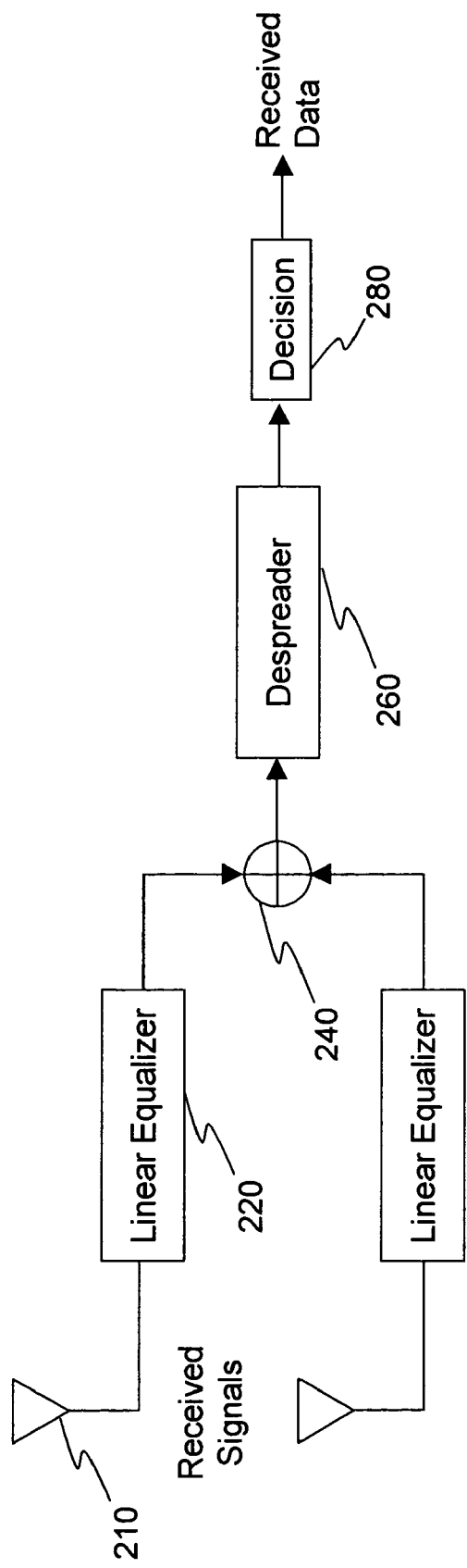
FIG. 2 is a block diagram of certain processes performed by a prior art CDMA receiver system implementing two chip-level linear equalizers and two receive antennas.
Figure 3:
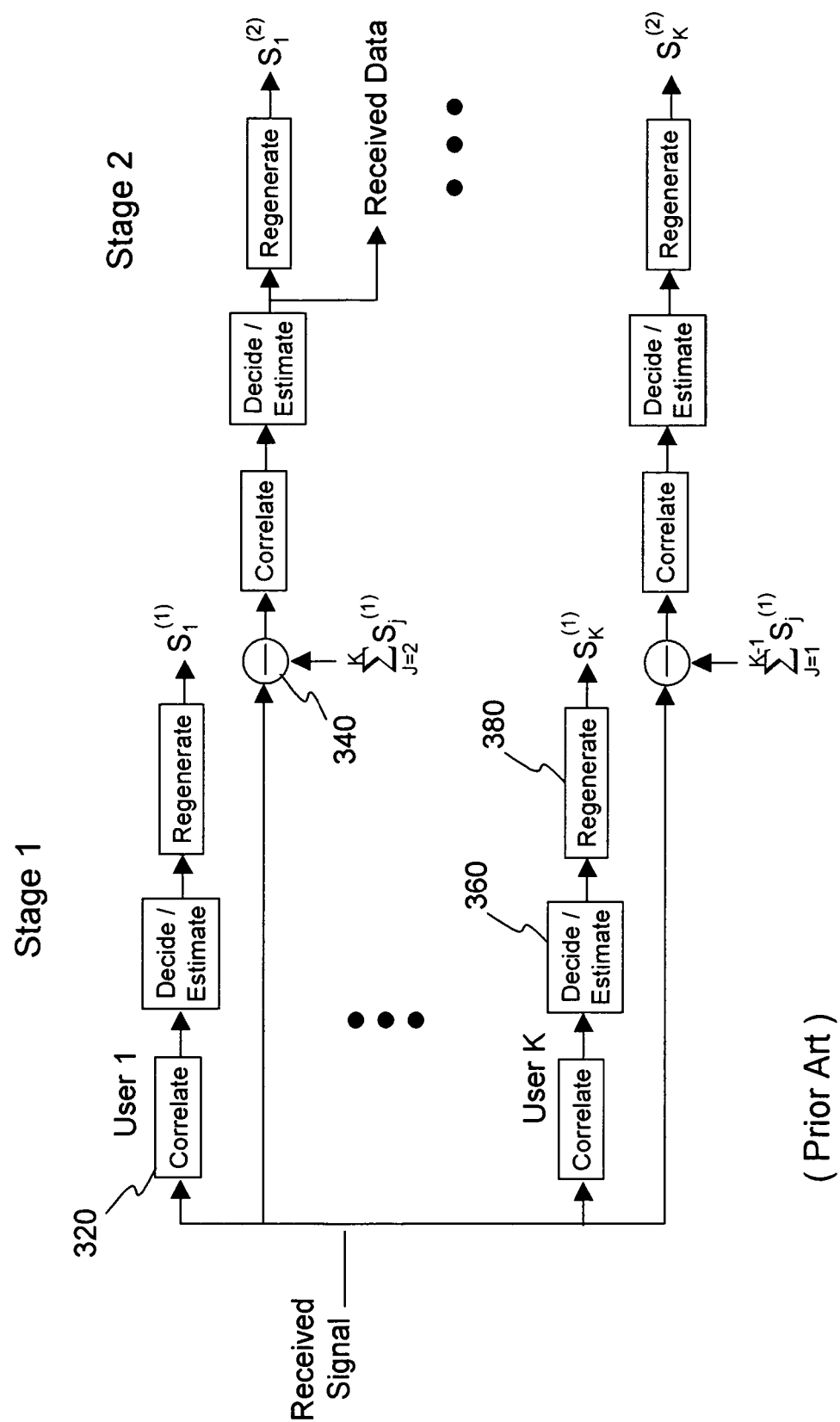
FIG. 3 is a block diagram of certain processes performed by a prior art system implementing a multiuser multistage interference canceller for a CDMA receiver.
Figure 4:
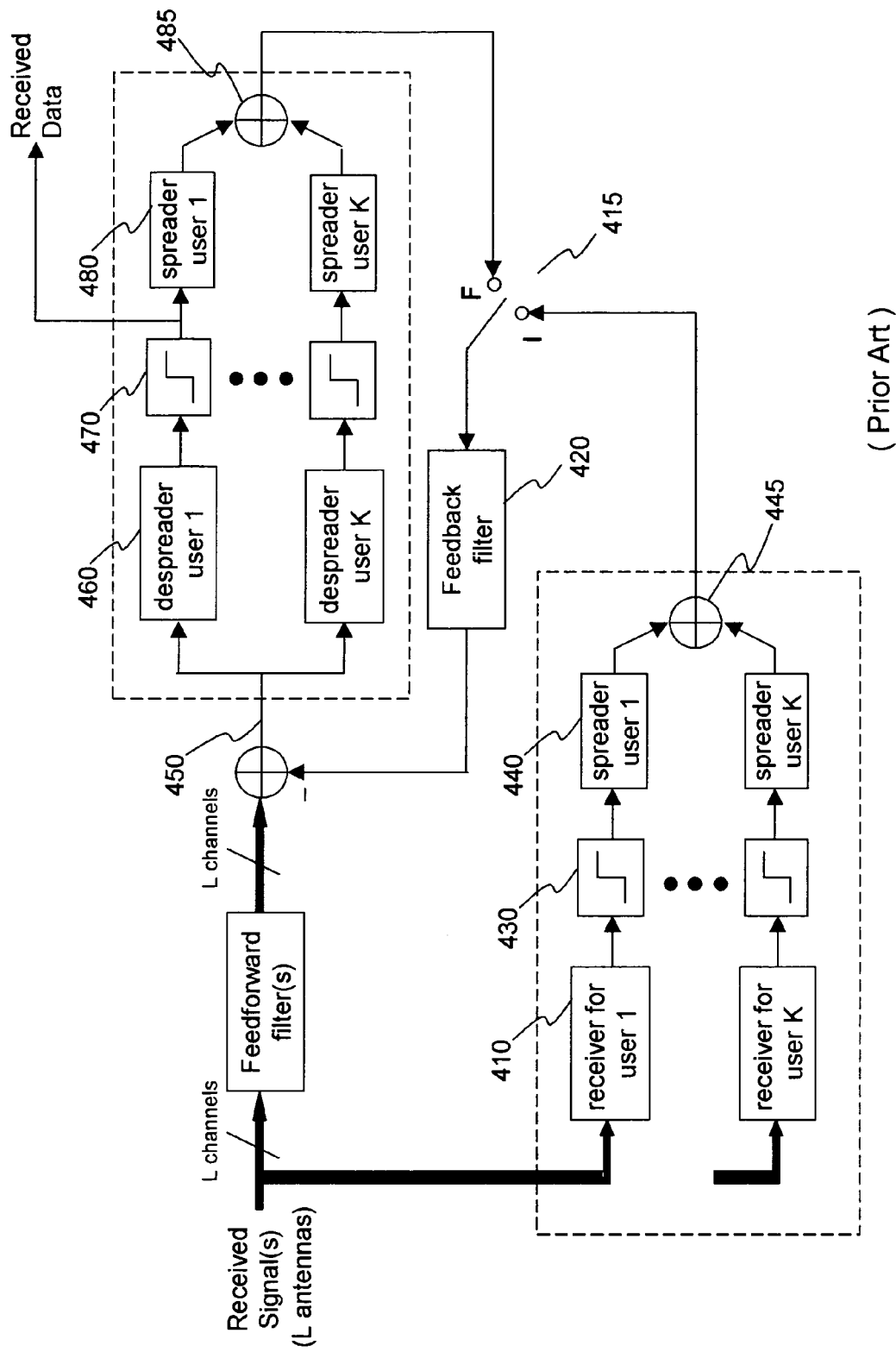
FIG. 4 is a block diagram of certain processes performed by a prior art system implementing an iterative chip-level DFE for a CDMA receiver.
Figure 5:
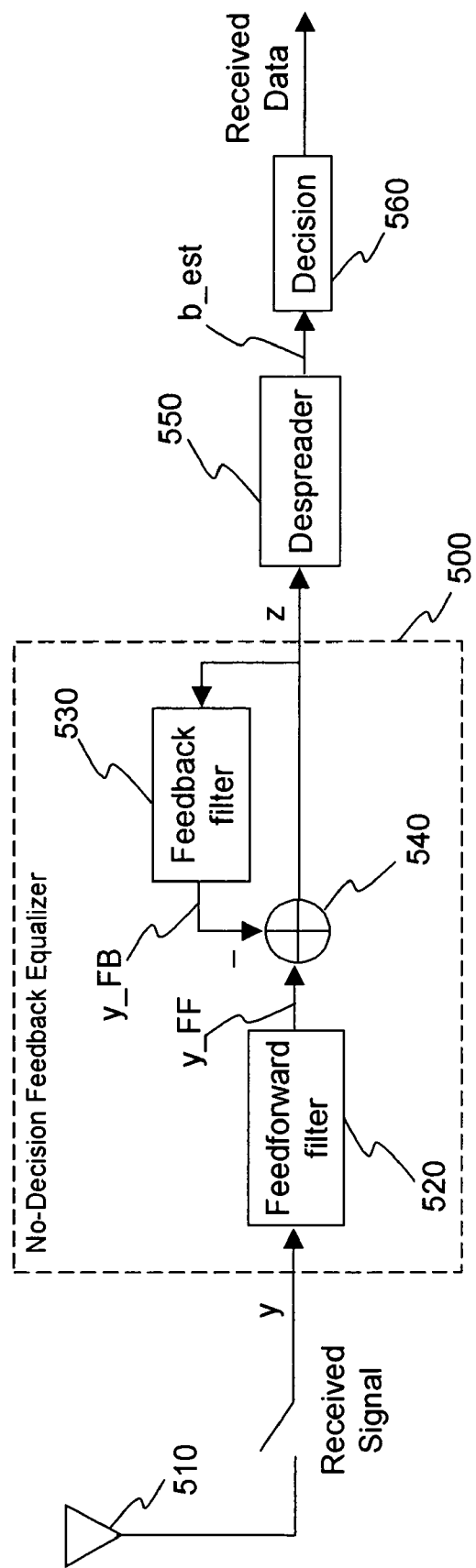
FIG. 5 is a block diagram of certain processes performed by a system implementing a chip-level NDFE in a CDMA receiver.

FIG. 5 shows a block diagram of certain processes performed by a system implementing a chip-level no-decision feedback equalizer (NDFE) 500 in a CDMA receiver. The performance of the chip-level NDFE receiver for the 3 G CDMA downlink signals is such that a handset application requires only a single antenna 510. The received signal is optimally sampled at the chip-rate to form the input y to the feedforward filter 520. The chip rate outputs of the feedforward filter 520 and the feedback filter 530, y_FF and y_FB, respectively, are differentially combined by summation element 540 to form the NDFE output, z=y_FF−y_FB. Note that the differential combiner output z is directly fed back as input to the feedback filter 530, without an intervening non-linear decision element. The feedforward filter, feedback filter and differential combiner form the NDFE that is identified in FIG. 5 and that is structurally an IIR linear filter with input y and output z. The NDFE output z is input to a despreader element 550 that applies the appropriate code, i.e., the product of the base station scrambling code and the user-data channel spreading code (OVSF), to extract the symbol estimates, b_est. These symbol estimates are then further processed by the decision element 560 that performs decoding and deinterleaving, as required, to generate the desired received data.

Figure 6:
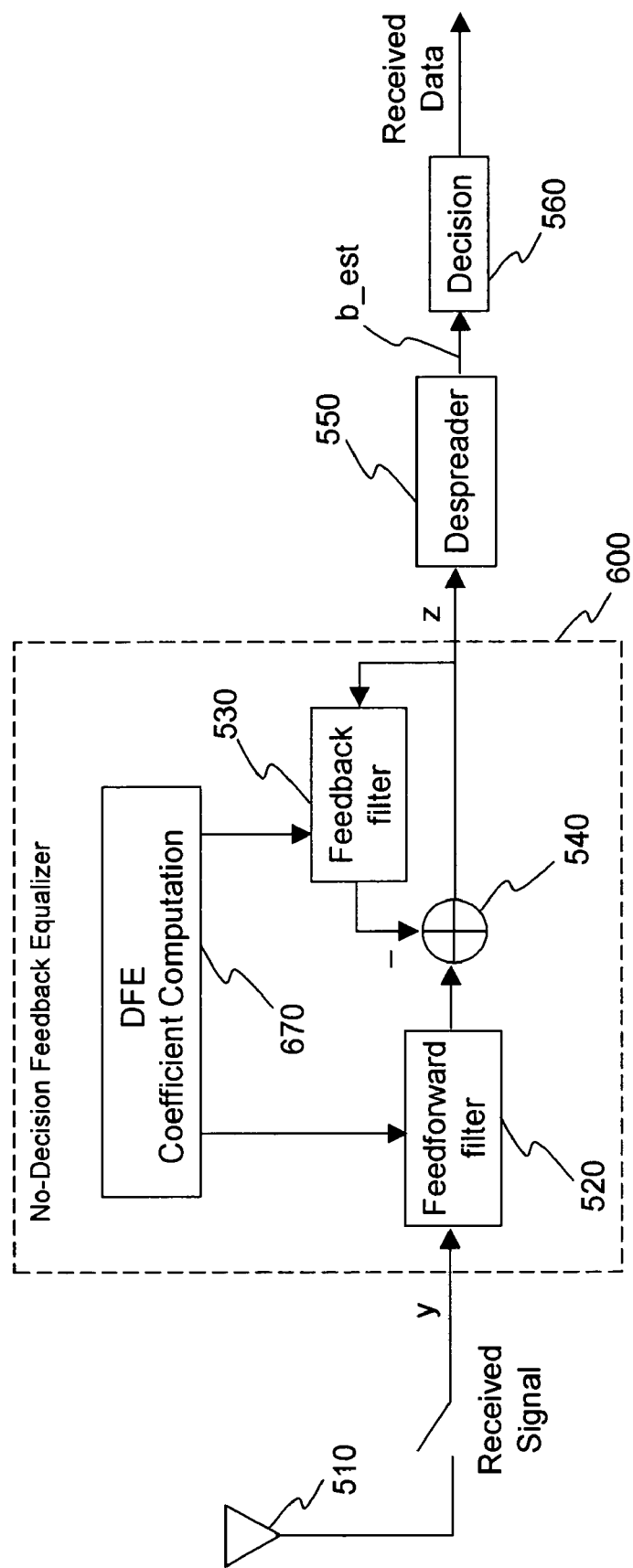
FIG. 6 is a block diagram of certain processes performed by a system implementing a chip-level NDFE in a CDMA receiver that includes a DFE coefficient computation element.

FIG. 6 is a block diagram of certain processes performed by a system implementing a chip-level NDFE in a CDMA receiver that includes a DFE coefficient computation element 670. According to a preferred embodiment, the DFE coefficient computation element 670 computes the coefficients for the feedforward filter 520 and the feedback filter 530 of the NDFE 600 based on the same mathematical formulas, algorithms or procedures used to compute the feedforward and feedback filter coefficients of a conventional DFE. For example, the coefficients may be computed for the well known MMSE-DFE by requiring that the DFE output be an MMSE estimate of the transmitted signal.

Figure 7:
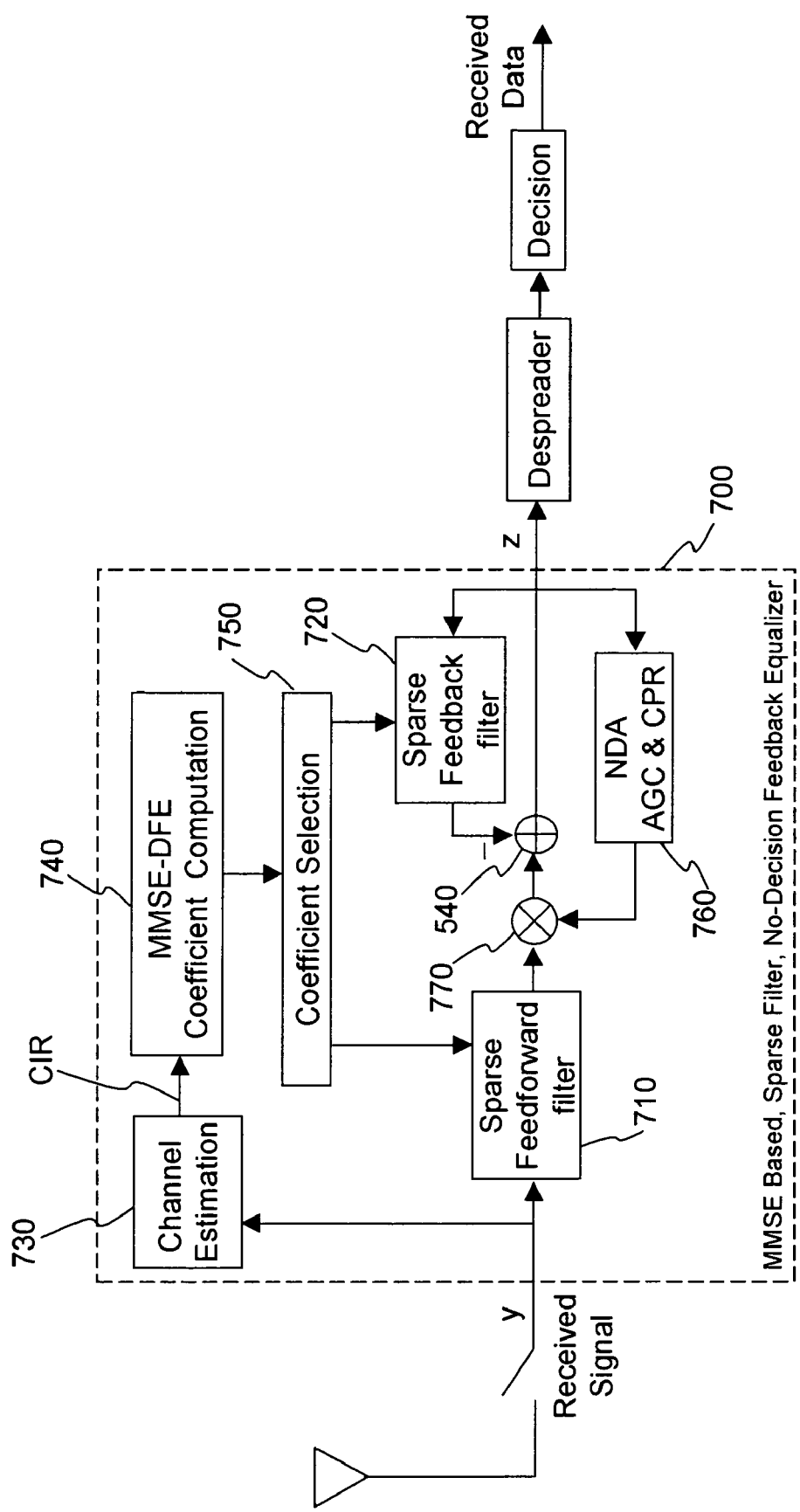
FIG. 7 is a more detailed block diagram of certain processes performed by a system implementing an MMSE based, sparse filter example of a chip-level NDFE in a CDMA receiver.

FIG. 7 is a more detailed block diagram of certain processes performed by a system implementing a chip-level NDFE in a CDMA receiver. This additional detail presents, by way of an example preferred embodiment, a means of achieving high performance with the NDFE based CDMA receiver using filter coefficients computed based on the traditional MMSE-DFE development. In this example, the feedforward and feedback filters, 710 and 720, respectively, are sparse in the sense that most of the filter coefficients are zero. The use of sparse feedforward and feedback filters reduces the complexity of the NDFE 700 while retaining the capability of equalizing multipath propagation channels with large delay spreads. Such propagation channels are common in large cell broadband wireless systems, for example 3G CDMA cellular systems. For further description of the significance of these sparse filters, the means of computing the MMSE-DFE filter coefficients from an estimate of the channel impulse response (CIR) and the means of selecting the non-zero filter coefficients see McKown's U.S. patent application, "Method and Apparatus for Single Burst Equalization of Single Carrier Signals in Broadband Wireless Access Systems".

Referring to FIG. 7, the channel estimation element 730 inputs the pilot data information contained in the CDMA downlink signal, e.g., the common pilot channel (CPICH) of the W-CDMA downlink signal, and estimates the chip-level channel impulse response, CIR, over a delay interval defined by Ncir, in units of chip intervals, that is greater than the maximum anticipated length of the channel impulse response. The delay lines of the sparse feedforward filter 710 and the sparse feedback filter 720 are of length Ncir and Ncir−1, respectively. The MMSE-DFE coefficient computation element 740 inputs the Ncir length complex CIR vector and outputs the full, complex feedforward and feedback coefficient vectors, g and f that are of length Ncir and Ncir−1, respectively. The coefficient selection element 750 inputs the g and f coefficient vectors and selects the most significant coefficients to implement in the sparse feedforward and feedback filters. The maximum number of selected coefficients, Ng and Nf, that are allowed for the sparse feedforward and feedback filters, respectively, are design parameters.

As discussed in the above McKown patent application, for a 5 MHz bandwidth signal Ncir=64 is a reasonable value for the length of the CIR estimate and Ng=16 and Nf=16 are reasonable values for the maximum number of allowed selected coefficients. The McKown patent application also points out that the coefficient selection process improves the overall performance due to CIR estimation/coefficient computation noise and the clustered nature of the significant elements in the channel impulse response of outdoor cell tower based propagation channels. Note that for a perfect propagation channel and perfectly matched transmit and receive filters, the coefficient selection element 750 will maximize the NDFE (or DFE) output SNR by selecting only one feedforward coefficient and zero feedback coefficients.

A suitable procedure for the MMSE-DFE coefficient computation 740, is given by Bin Yang, "*An Improved Fast Algorithm for Computing the MMSE Decision-Feedback Equalizer*", Int. J. Electronic Communications (AEU), Vol. 53, No. 6, pp. 339-345 (1999). Interestingly, this procedure allows a lead of Ncausal>0 chip intervals in the CIR estimate to provide a feedforward coefficient vector g that is partially causal as well as anti-causal. This allows Ncausal coefficients of the feedforward filter (if selected) to filter forward in time in addition to the selected coefficients of the feedback filter. For example, Ncausal=5 has shown superior experimental receiver performance than Ncausal=0.

Since chip-level decisions are not generated in the chip-level NDFE CDMA receivers of FIGS. 5, 6 and 7, the usual decision directed carrier phase recovery (DD CPR) procedure that is beneficial for the conventional DFE operation is not available here. However, a non-data aided CPR (NDA CPR) procedure that applies well here is to use the phase error detector $\epsilon$ defined by $\epsilon=I*Q^3-Q*I^3$ where I and Q are the inphase and quadrature components of z. Such a procedure is derived on page 276 of U. Mengali and A. N. D'Andrea, "*Synchronization Techniques for Digital Receivers*", Plenum Press, New York and London, 1997, with reference to G. J. Foschini, "*Equalizing Without Altering or Detecting Data*", Bell System Technical Journal, 64, pp. 1885-1911, October 1985. A second-order tracking loop such as developed in Section 5.3.8 of Mengali and D'Andrea completes the design of the NDA CPR scheme. Similarly, an NDA automatic gain control (NDA AGC) can be developed based on a gain error detector $\epsilon_g$ defined as $\epsilon_g=(|z|-\Gamma)/\Gamma$ where $\Gamma$ is the reference amplitude of z. A first order tracking loop defined by AGC=1−MAF($\rho_g*\epsilon_g$) where MAF is a moving average filter and $\rho_g$ is a gain term completes the design of the NDA AGC scheme. Referring to FIG. 7, the NDA CPR and AGC feedback loops in element 760 together provide a complex scalar that multiplies the output of the feedforward filter 710 in multiplication element 770 ahead of the differential combiner element 540 of the NDFE.

As expected there is a loss of output SNR when the NDFE is compared to the ideal chip-level DFE that has perfect chip-level decisions available—the NDFE inputs signal plus noise to the feedback filter whereas the ideal DFE inputs only signal. However, using the example design of FIG. 7 and the 3GPP specified multipath test channels, this loss of output SNR has been experimentally observed to be surprisingly small, i.e., on the order of 1 to 4 dB in the operational region of interest.

Furthermore, in reported simulations the prior art MPIC and iterative DFE perform poorly compared to the ideal chip-level DFE defined by perfect chip decision feedback. As pointed out by Choi, et. al., there is a large performance gap between the ideal chip-level DFE and the simulations of any of the above mentioned (FIGS. 1 to 4) prior art receiver structures for the CDMA downlink. FIG. 6 of Choi, et. al., indicates that this performance gap is greater than 30 dB given adaptive implementations of the linear equalizer, MPIC and the iterative DFE and given the specific 60 kilometer per hour multipath channel used to test. The MPIC experiences a similar performance gap between theory and practice. Both the MPIC and the iterative DFE are recursive, non-linear interference cancellers that experience error propagation and are sensitive to errors in the detailed signal estimates. The feedforward, linear NDFE does not have these problems.

Figure 8:
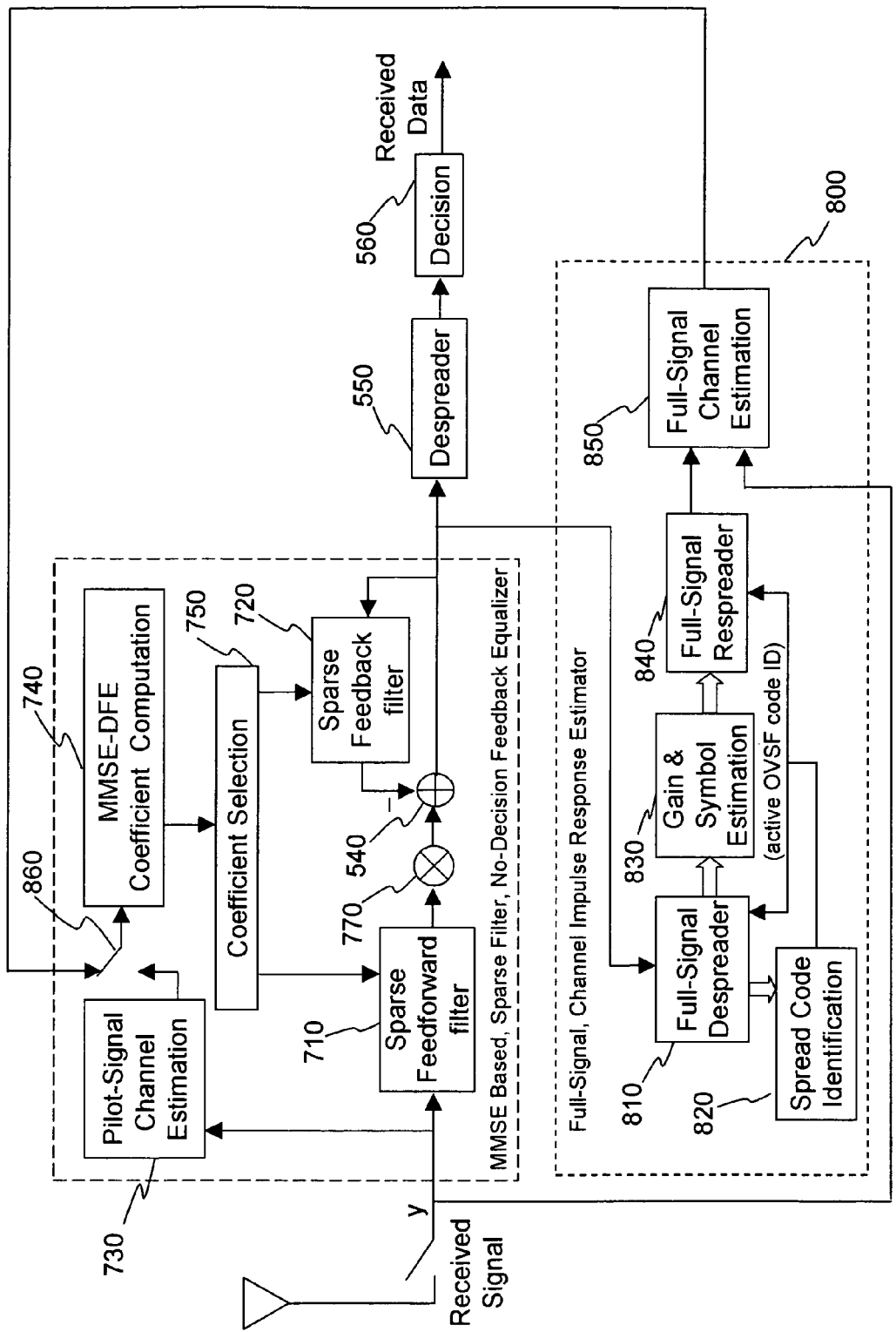
FIG. 8 is a block diagram of certain processes performed by a system implementing a chip-level NDFE in a CDMA receiver that includes a full-signal channel impulse response estimator.

FIG. 8 is a block diagram of certain processes performed by another preferred embodiment of a system implementing a chip-level NDFE in a CDMA downlink receiver. This embodiment includes a full-signal channel impulse response estimator 800 as a means of optimizing the performance of the NDFE. For the W-CDMA downlink receiver example in FIG. 8, a all-code despreader element 810 inputs the output of the NDFE. The all-code despreader element 810 provides despread symbol outputs for all possible OVSF codes to a spread code identification element 820 that determines the set of active OVSF codes in the downlink transmission. The active OVSF code identifications (ID) are used to select the despread output of the NDFE in the all-signal despreader element 810 providing the parallel input to a symbol and gain estimation element 830. The symbol and gain estimation element 830 provides parallel estimates of the gain and symbol of each physical channel in the downlink transmission. Further consideration will be given in the sequel to a novel means of performing all-code despreading 810 and active code identification 820.

Referring again to FIG. 8, the active OVSF code ID and the symbol and gain estimates are input to the full-signal respreader element 840 that constructs a model of the received multiuser W-CDMA downlink signal. The full-signal channel estimation element 850 inputs the full-signal model as well as the received signal, y, to provide a better channel estimate than can be obtained from a pilot only, e.g. CPICH, channel estimation element 730, especially for a heavily loaded downlink signal. Once the more accurate channel estimate is available, the CIR selection switch 860 connects the input to the MMSE-DFE coefficient computation element 740 to it and the output SINR performance of the NDFE improves. The well known adaptive least mean squares (LMS) algorithm can be used for the channel estimation element 850 as well as the CPCIH channel estimation element 730. For example, A. U. H. Sheikh, S. Faisal, and A. Shah describe this LMS adaptive channel estimation in "*Downlink Channel Estimation for IMT-D5System*", Personal, Indoor and Mobile Radio Communications, 2001 12th IEEE International Symposium on, Volume: 2, October 2001.

Another aspect of the example preferred embodiments illustrated in FIGS. 7 and 8 is the potential of performing adaptive coefficient adjustment to further improve the performance. This coefficient adaptation can substantially reduce the MAI due to the downlink signals of other base stations and/or the uplink signals of other subscribers. It is well known that direct application of adaptive coefficient adjustment is problematic given the large delay spreads associated with cell tower based broadband wireless systems. The problem is due to the large number of coefficients required in traditional non-sparse feedforward and feedback filters in order that the delay span of the filters is greater than the anticipated delay spread of the RF propagation channel. However, the coefficient selection process 750 reduces the number of active coefficients so that the coefficients can be efficiently adapted based on an available error measure. Examples of means for adapting the chip-level filter coefficients are given by M. Abduirahman, et al., "*Decision feedback equalization for CDMA in indoor wireless communications*", IEEE J. Select. Areas Commun., May 1994; F. Petre, et al., "*Pilot-aided adaptive chip equalizer receiver for interference suppression in DS-CDMA forward link*", Proc. IEEE VTC-Fall 2000 and P. Schniter and A. R. Margetts, "*Adaptive chip-rate equalization of downlink multirate wideband CDMA*", IEEE Proc. Asilomar Conf. On Signals and Computers, November 2002.

Figure 9:
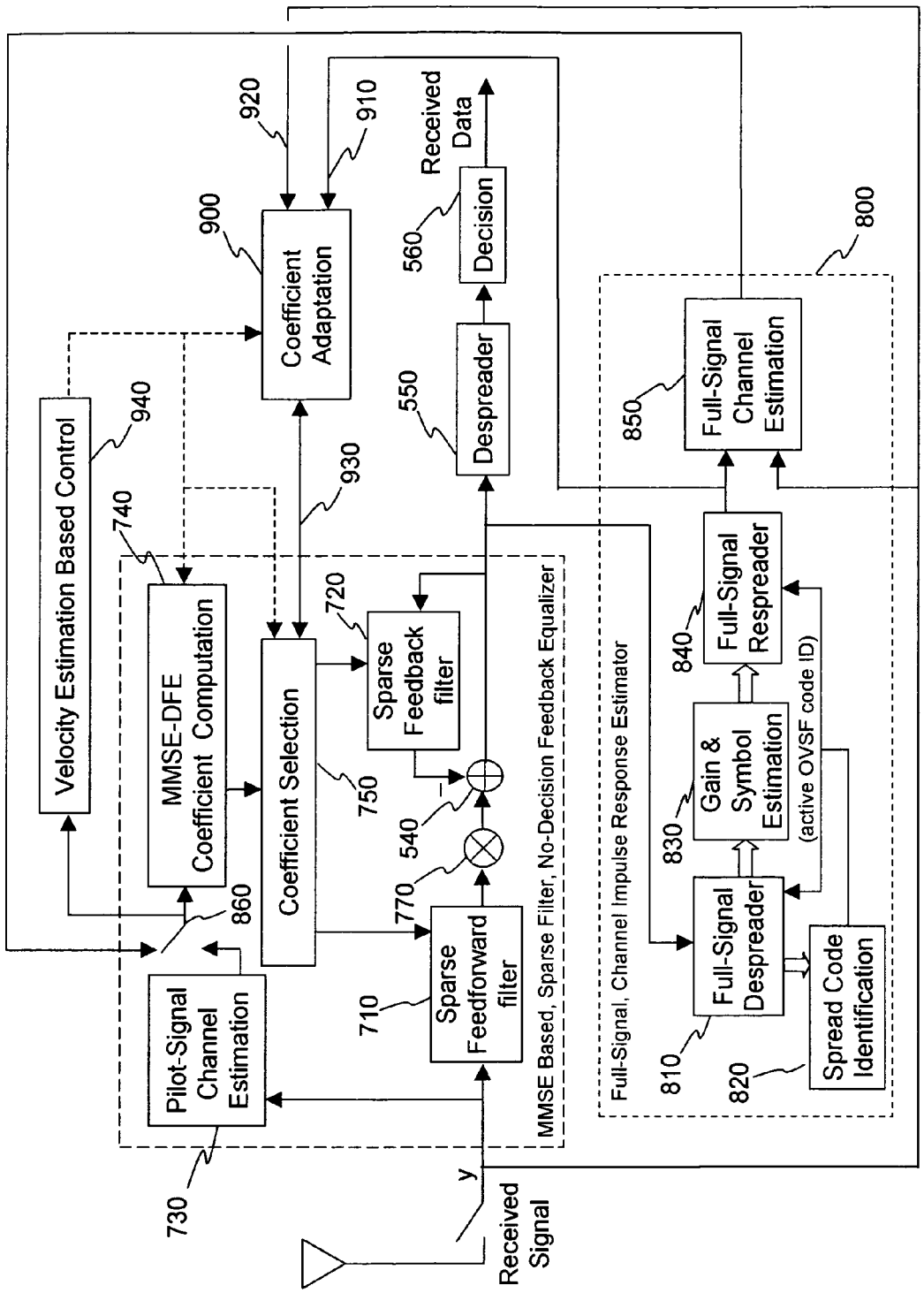
FIG. 9 is a block diagram of certain processes performed by a system implementing a chip-level NDFE in a CDMA receiver that includes a full-signal channel impulse response estimator and a coefficient adaptation element.

FIG. 9 is a block diagram of certain processes performed by another preferred embodiment of a system implementing a chip-level NDFE in a CDMA downlink receiver. This embodiment is an extension of the embodiment in FIG. 8 in that a coefficient adaptation element 900 is included that adapts the coefficients selected by element 750 based on input of the estimated full-signal 910 and the received signal, y, 920. For example, the normalized least means squared (NLMS) algorithm can be used to minimize the error between the estimated full signal 910 and the NDFE output given input 920. The adapted, selected coefficients can then be used to update the selected coefficients by means of communications bus 930. A velocity estimation based control element 940 is included in the embodiment of FIG. 9 to govern the source of the selected coefficients that are used to update the NDFE's sparse feedforward filter 710 and sparse feedback filter 720.

At sufficiently high mobile subscriber velocity, the best receiver performance is obtained using only the computed coefficients from element 740. At lower mobile subscriber velocities, the coefficients are still selected based on the output of the coefficient computation element 740, but their values are updated based on the coefficient adaptation element 900. An example of a means of estimating the subscriber velocity from the channel estimates is given by M. Sakamoto, et al., "Adaptive channel estimator with velocity estimator for W-CDMA receiver", Proc. IEEE VTC, May 2000, The preferred embodiments of FIGS. 7, 8 and 9 provide a performance versus complexity trade-off. All three embodiments are considered to be high performance compared to prior art in terms of mitigating the effects of multipath and vehicular speed Doppler propagation channel distortions. Table 1 provides a complexity analysis for the processing elements contained in the illustrated examples of preferred embodiments. Also included in the complexity analysis of Table 1 are the required timing recovery and interpolation processing elements that have not been included in the illustrations. Design trade-offs allow the receiver performance to be gradually increased as the allowed computation is increased. For example, the total amount of integer computations that have been considered in example designs for a W-CDMA receiver are from ~500,000 additions & ~250,000 multiplies to ~1,500,000 additions & ~500,000 multiplies per W-CDMA slot (i.e., per 10/15 milliseconds). The precision of both the additions and the multiplications can be 12 bit 2's complement. These complexities are understood to allow implementations of the chip-level NDFE receiver examples of this invention that are similar to or less than the complexity of using a conventional rake receiver for W-CDMA and much less than the complexity of the chip-level NDFE or the MPIC receivers.

Further consideration will now be given to a novel means of performing full OVSF despreading 810 and OVSF active code identification 820. Given the active OVSF code identification and the corresponding despread symbols, it is straightforward to estimate the associated symbol and gain parameters 830 and the perform the full-signal respreading 840 that constructs a model of the received multiuser W-CDMA downlink signal.

Figure 10:
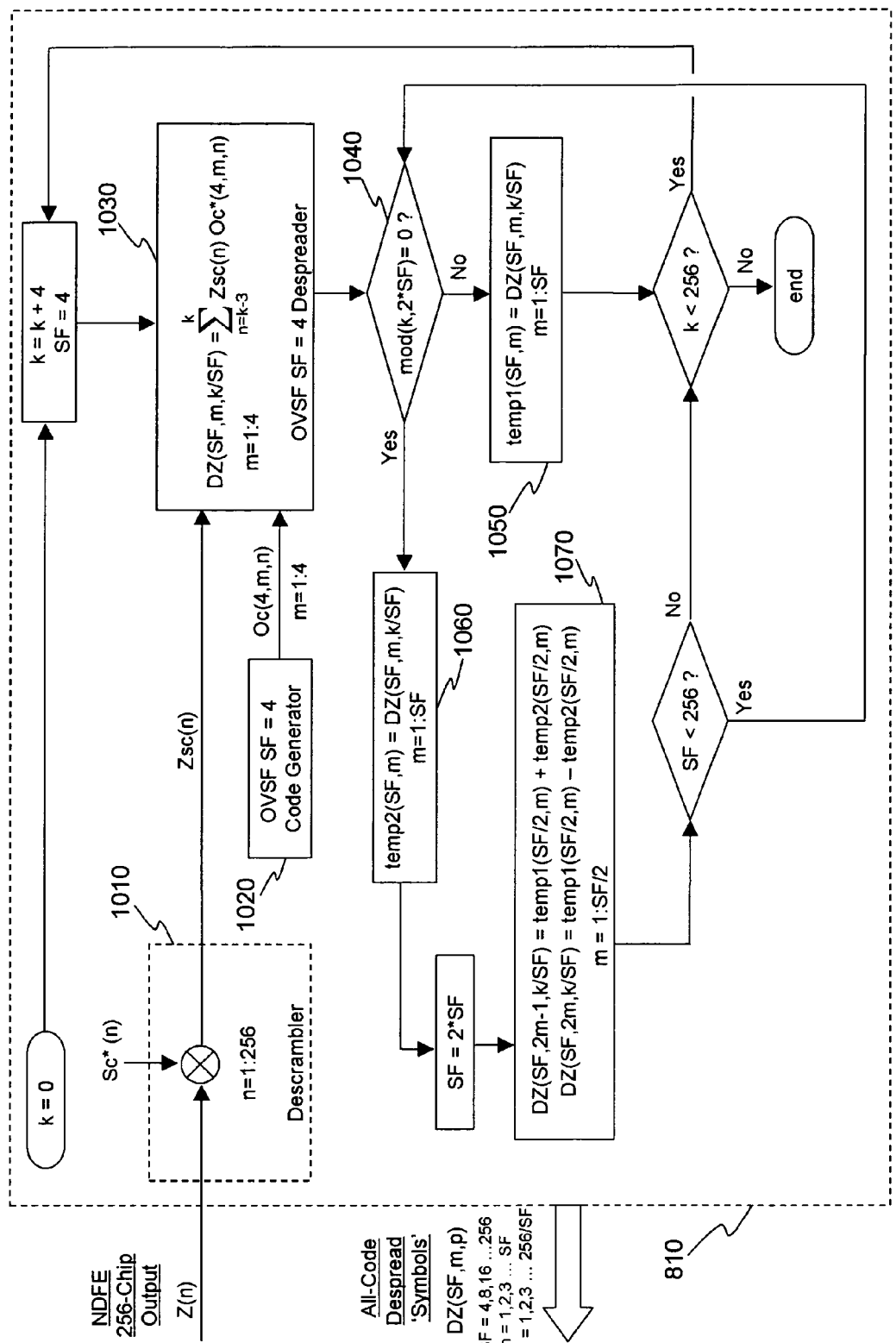
FIG. 10 is a block diagram of certain processes that perform all-code despreading, i.e., processing element 810 in FIGS. 8 and 9.

FIG. 10 is a block diagram of certain processes performed by a preferred embodiment of a system performing the all-code despreading, i.e., processing element 810 in FIGS. 8 and 9. In this example, the input to the all-code despreader is the NDFE output, $Z(n)$, and the output is the descrambled, despread 'symbols' at all standard W-CDMA OVSF codes, e.g., the 'symbols' associated with the OVSF codes for spread factors SF=4, 8, 16, 32, 64, 128 and 256. At each spread factor level, SF, there exist SF orthogonal OVSF codes. If a particular OVSF code is not active, the output 'symbols' are either not fully despread signal or can be thought of as noise.

Referring to FIG. 10, the NDFE output, $Z(n)$, is input to the descrambler processing element 1010 that multiplies $Z(n)$ by the conjugate of the known scrambling code sequence, $Sc^*(n)$, that is associated with the particular base station being received. The descrambled product, $Zsc(n)$, is produced and processed in blocks of 256 chips, i.e., n=1 to 256, synchronous with the scrambling code sequence. In particular, the descrambled product, $Zsc(n)$, is input to the OVSF SF=4 despreader element 1030 that despreads every group of 4 chips using the 4 orthogonal OVSF SF=4 codes that are repetitively generated by the OVSF SF=4 code generator element 1020. No other OVSF codes are explicitly generated or required in the all-code despreader invention example illustrated in FIG. 10. Instead, the OVSF code generator relationships are employed to generate the despread outputs

TABLE 1

Complexity Analysis

| PROCESSING ELEMENT (in order of initial invocation) | ADDITIONS (real adds per Slot = 2560 chips = 10/15 milliseconds) | MULTIPLICATIONS (real multiplies per Slot = 2560 chips) |
|---|---|---|
| Interpolation (Farrow Parabolic) | 2 * 9 * 2560 | 2 * 2 * 2560 |
| Pilot Signal Channel Estimation (LMS) (L = CIR length in chips, e.g., 32) | 4 * (L + 1) * 2560 <low precision> | 4 * (L + 1) * 2560 <low precision> |
| Timing Recovery (M = resolution per chip, e.g., 32) (K = SBP cycles per slot, e.g., 10 or 1 when adaptive) | ~K * 4 * (L + 1) * M | ~K * 8 * (L +1) * M |
| MMSE-DFE Coefficient Computation (inverse square roots for Givens coefficients use table look up) | ~K * (12 * L * L + 2 * L) | ~K * (16 * L * L + 8 * (L + 1)) |
| Coefficient Selection | ~K * 12 * L | ~K * 12 * L |
| NDFE (Sparse IIR Filter) (F = # FFF coefficients, B = # FBF coefficients, e.g. F + B < 24) | 4 * (F + B + 1) * 2560 | 4 * (F + B + 1) * 2560 |
| All-Code Despreader | 10 * 4096 | — |
| Spread Code Identification | ~10 * 5120 | ~10 * 256 |
| Gain & Symbol Estimation, Full-Signal Respreader | ~10 * 4096 | — |
| Full-Signal Channel Estimation (LMS) | K * 4 * (L + 1) * 256 <low precision> | K * 4 * (L + 1) * 256 <low precision> |
| Chip Rate Coefficient Adaptation (NLMS) (requires separate iteration of NDFE over each 256 chip block) | 4 * (F + B + 1) * 2560 <regular> + 4 * (F + B + 1) * 2560 <low precision> | 4 * (F +B + 1) * 2560 <regular> + 4 * (F + B + 1) * 2560 <low precision> |
| Symbol Rate Coefficient Adaptation (NLMS) (P = number of physical channels used for adaptation) (S = average spread factor per physical channel used) | P * 4 * (F +B) * 2560 + P * 4 * (F + B + 1) * (2560/S) <low precision> | P * 4 * (F + B + 1) * (2560/S) <low precision> |
| Velocity Estimation & Delay Spread Based Control | ~K * 12 * L | ~K * 12 * L | for the OVSF codes associated with SF>4 based on the despread outputs for the OVSF SF=4 codes.

Referring to FIG. 10, the 4 outputs from the OVSF SF=4 despreader 1030 become available every 4 chips, e.g., at k=4, 8 . . . 256, are retained into memory as either temp2(SF,m) 1060 or tempt (SF,m)) 1050 depending on whether or not mod(k,2*SF)=0, respectively, at decision element 1040. The function mod(x,y) or x modulus y is the remainder of the integer division x/y. For example, the temp1(SF,m)) memory 1050 is used for k=4, 12, . . . 252. When the temp2(SF,m)) memory 1060 is used, i.e., at k=8, 16, . . . 256, the SF is doubled and the processing proceeds to the despreader generator element 1070 that generates the despread 'symbols', DZ(SF,m,k/SF), for the SF=8 level OVSF codes. The mod(k, 2*SF)=0 decision element 1040 is then re-employed and the level SF=8 despread 'symbols', DZ(SF,m,k/SF), are stored as either temp1(SF,m)) 1050 if k=8, 24 . . . 248 or as temp2(SF, m)) 1060 if k=16, 32 . . . 256. Whenever the temp1(SF,m)) memory 1050 is loaded, the processing returns to the OVSF SF=4 despreader element 1030 after incrementing k by 4. This processing cycle continues until completion at k=256. Upon completion, the 256 chip input, Z(n) for n=1 to 256, has been descrambled and despread to the all-code 'symbol' outputs, i.e., to DZ(SF,m,p) for SF=4, 8, 16, . . . 256, for m=1, 2, 3 . . . SF, and for p=1, 2, . . . 256/SF. This inventive approach of despreading the SF>4 codes by using the OVSF code generator relation in element 1070 achieves the goal of all-code despreading with the minimum amount of computation. It is straightforward to extend this example design of the all-code despreader processing element 810 to other despreading code systems provided the spread codes are built from a generator function.

Figure 11:
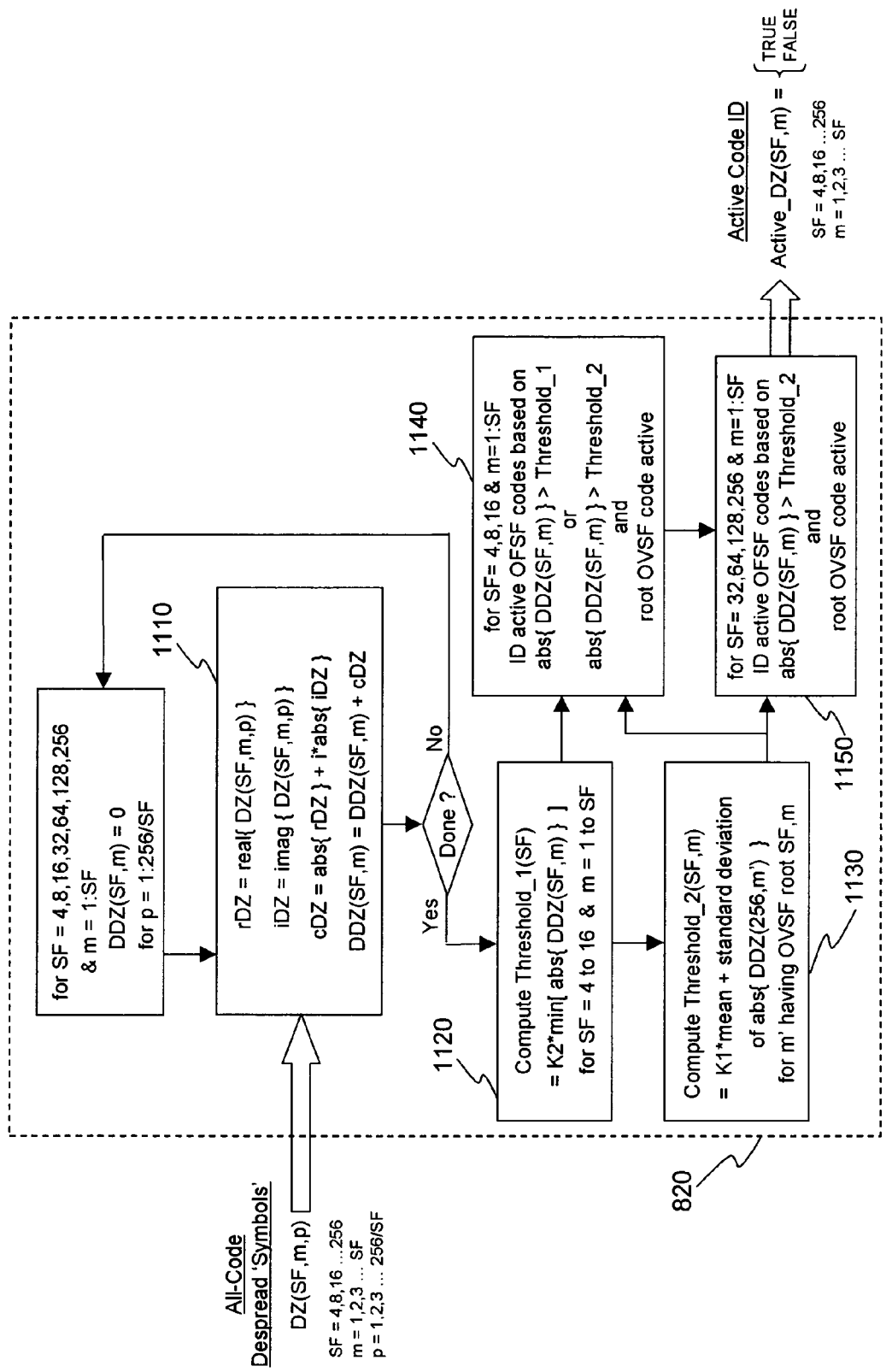
FIG. 11 is a block diagram of certain processes that perform active spread code identification, i.e., processing element 820 in FIGS. 8 and 9.

FIG. 11 is a block diagram of certain processes performed by a preferred embodiment of a system performing the active spread code identification, i.e., processing element 820 in FIGS. 8 and 9. The all-code despread 'symbols' that are output from processing element 810 are input to the spread code identification element 820. A sign corrected complex integration is performed in processing element 1110 that independently integrates the inphase and quadrature absolute values of the all-code despread 'symbols', DZ(SF,m,p) over p=1, 2, . . . 256/SF for each possible code, i.e. for each combination of SF and m, forming the value DDZ(SF,m). The magnitudes of DDZ(SF,m) are used by processing elements 1120, 1130, 1140 and 1150 to identify the active codes at the output of processing element 820, i.e., Active_DDZ(SF,m) being marked as TRUE or FALSE.

Referring to FIG. 11, processing element 1120 computes Threshold_1 (SF) proportional to the minimum magnitude of DDZ(SF,m) for m=1, 2, . . . SF. If a branch of the code tree is inactive, then Threshold_1 (SF) will represent a noise threshold such that a DDZ(SF,m) magnitude greater than Threshold_1 (SF) indicates activity at the SF,m code. Processing element 1130 computes Threshold_2(SF,m) for SF<256 proportional to the mean and standard deviation of the magnitude of DDZ(SF=256,m') where the set of m' are restricted to be generated from the code for SF,m. Threshold_2(SF=256,m) is set equal to Threshold_2(SF=128,m") where the code indexed as 256,m is generated from the code indexed as 128,m". Since the utilization of the SF=256 codes is uncommon (except for known overhead functions such as pilots and synchronization), Threshold_2(SF,m) will represent a noise threshold such that a DDZ(SF,m) magnitude greater than Threshold_2(SF,m) indicates activity at the SF,m code. Threshold_2(SF,m) is a local threshold in the sense that it is derived only from codes generated by SF,m. Threshold_2(SF, m) is not contaminated by signal activity in other code branches at this SF level, i.e., activity at codes SF,m' where m'~=m.

Referring to FIG. 11, processing element 1140 inputs the thresholds computed in processing elements 1120 and 1130 and decides activity for OVSF codes indexed as SF,m for SF=4, 8, 16 and m=1, 2, . . . SF. Activity is established based on the magnitude of DDZ(SF,m) exceeding either Threshold_1 (SF) or Threshold_2(SF,m) provided there is activity in the associated root code index. The associated root code index is defined as the index of the OVSF code from which the SF,m indexed OVSF code is generated. This root code index criteria is not applied to the first, SF=4 code level and the order of activity decision making is that of increasing SF code levels. As activity is decided to be TRUE at a given OVSF code index, e.g., SF=16 and m=7, the activity of the root code index, e.g., SF=8 with m=4, is set FALSE. The former TRUE activity decision at the root OVSF code index is viewed as a preliminary decision since this 'activity' may be due to activity at a higher spread factor OVSF code that is generated by from the root code index.

Referring to FIG. 11, processing element 1150 inputs the local thresholds Threshold_2(SF,m) computed in processing element 1130 and decides activity for OVSF codes indexed as SF,m for SF=32, 64, 128, 256 and m=1, 2, . . . SF. Activity is established based on the magnitude of DDZ(SF,m) exceeding Threshold_2(SF,m) provided there is activity in the associated root code index. As activity is decided to be TRUE at a given OVSF code index the activity of the root code index is set FALSE. This completes the OVSF code identification of processing element 820 providing the code identification output Active_DS(SF,m)=TRUE or FALSE for SF=4, 8, 16, 32, 64, 128, 256 and m=1, 2, . . . SF. It is straightforward to extend this example design of the OVSF spread code identification processing element 820 to other code systems.

Referring to FIGS. 8 and 9, the all-code despreader 810 and the spread code identification 820 provide the input required of the gain and symbol estimation 830. For the active codes, i.e., SF and m where Active_DS(SF,m)=TRUE, the gain is determined by the magnitude of DDZ(SF,m) and the symbol decisions are derived from the associated soft symbols, DZ(SF,m,p), as usual, i.e., for QPSK by the sign of the inphase (real) and quadrature (imaginary) components. The full-signal respreader 840 uses the gain and symbol decisions for the active codes to generate a model of the transmitted signal. To complete the transmitted signal model it is necessary to perform similar format identification and gain estimation on the pilot and synchronization channels. The transmitted signal model output of full-signal respreader 840 is input to the full-signal channel estimation processing element 850 as described above for FIGS. 8 and 9.

In summary, the chip-level NDFE receiver corrects the primary inter-chip interference that occurs when a 3 G CDMA signal is received through a multipath propagation channel. In addition to improving CDMA signal containing only a single data channel, this solves the problem of the loss of channel spread code (Walsh or OVSF) orthogonality when the CDMA downlink signal is loaded with multiple summed data channels. As a result, the output of the chip-level NDFE can be simply despread using the appropriate user-data channel code to directly provide high SIR symbol estimates, that in turn, provide reliable received data to the user.

The development of the low complexity, chip-level NDFE for 3 G CDMA handsets allows the base station to use higher multiuser loading and less spreading. The example designs presented herein have been tested with the 3GPP specified vehicular speed multipath test channels. These tests indicate that the chip-level NDFE enables a 3 G CDMA system to deliver high rate data to vehicular speed mobile users in difficult multipath propagation environments. Incorporation of the chip-level DFE into W-CDMA handsets will significantly increase the capacity of the service provider's existing W-CDMA base stations and enable reliable HSDPA operation to mobile subscribers.

Although an exemplary embodiment of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A method for constructing a model of a sampled transmitted CDMA downlink signal, comprising:
   receiving a sampled signal at a first module (810), wherein the signal received at the first module has been filtered;
   receiving despread symbol data for all possible spread codes at a second module (820) from the first module;
   determining active codes of the possible spread codes in the filtered sampled signal by the second module;
   receiving from the first module, the despread symbol data identified with the active codes, at a third module (830);
   providing estimates of a symbol value and a gain based on the symbol data identified with the active codes by the third module;
   receiving the symbol value and gain estimates from the third module and the active codes from the second module at a fourth module (840); and
   constructing a model of the sampled transmitted CDMA downlink signal using the symbol value and gain estimates for the active codes by the fourth module.

2. A method for providing coefficients of a channel equalization filter based on a model of a sampled transmitted CDMA downlink signal, comprising:
   receiving the sampled received CDMA downlink signal and the model of the sampled transmitted CDMA downlink signal at a first module (850);
   estimating a full-signal channel impulse response based on the sampled received CDMA downlink signal and the model of the sampled transmitted CDMA downlink signal by the first module;
   receiving the sampled received CDMA downlink signal by a second module (730);
   estimating a pilot-signal channel impulse response based on the sampled received CDMA downlink signal and a well known pilot signal by the second module;
   receiving the full-signal channel impulse response from the first module and the pilot-signal channel impulse response from the second module by a third module (860);
   selecting between the full-signal channel impulse response and the pilot-signal channel impulse response by the third module;
   receiving the selected channel impulse response by a fourth module (740); and
   computing the coefficients of a channel equalization filter based on the selected channel impulse response by the fourth module.

* * * * *